United States Patent [19]

Miller, Jr. et al.

[11] Patent Number: 4,556,313
[45] Date of Patent: Dec. 3, 1985

[54] SHORT RANGE OPTICAL RANGEFINDER

[75] Inventors: Walter E. Miller, Jr.; Richard G. Westrich, Jr., both of Huntsville; Michael M. Jones, Arab, all of Ala.

[73] Assignee: United States of America as represented by the Secretary of the Army, Washington, D.C.

[21] Appl. No.: 434,796

[22] Filed: Oct. 18, 1982

[51] Int. Cl.[4] .................... G01C 3/10; G01C 3/08; F42C 13/02
[52] U.S. Cl. .................... 356/1; 102/213; 356/4
[58] Field of Search .................... 356/1, 4, 5; 102/213

[56] References Cited

U.S. PATENT DOCUMENTS

| | | | |
|---|---|---|---|
| 2,297,534 | 9/1942 | Brulin | 250/1 |
| 2,350,820 | 6/1944 | Rettinger | 250/1 |
| 2,379,496 | 7/1945 | Saunier, Jr. | 88/1 |
| 2,489,297 | 10/1949 | Labin et al. | 343/17.1 PN |
| 3,493,769 | 2/1970 | Revesz et al. | 356/431 |
| 3,512,888 | 5/1970 | Humphrey | 356/4 |
| 3,892,483 | 7/1975 | Saufferer | 356/4 |
| 4,010,689 | 3/1977 | Sochard et al. | 102/213 |
| 4,068,222 | 1/1978 | Treviranus | 356/5 |
| 4,409,900 | 10/1983 | Currie | 102/213 |

Primary Examiner—S. C. Buczinski
Attorney, Agent, or Firm—Anthony T. Lane; Robert P. Gibson; Freddie M. Bush

[57] ABSTRACT

An optical rangefinder having a transmitter and receiver located closely adjacent for short range operation allows optimum detection of a target when either or both the target and the rangefinder are moving. An optical window region is established where the transmitter look axis intersects the receiver look axis and is adjustable for providing an output signal when the rangefinder and target are less than approximately ten feet apart. The transmitter may emit either noncoherent or coherent infrared energy. The receiver includes zero crossing detection when a received maximum signal intensity is reached and adequate signal detection means which activates when the signal level exceeds a desired minimum. An output signal is generated when the outputs of these two detection circuits are coincident.

2 Claims, 5 Drawing Figures

SHORT RANGE OPTICAL RANGEFINDER

DEDICATORY CLAUSE

The invention described herein may be manufactured, used, and licensed by or for the Government for governmental purposes without the payment to us of any royalties thereon.

BACKGROUND OF THE INVENTION

In detecting the near proximity between objects such as a projectile and a target wherein at least one of the objects and possibly both objects are moving at high speed, it is often desirable to activate circuitry within the projectile at a selectable distance from the target before impact occurs. As flight speeds and closing speeds increase these distances for activation are also subject to change. Accordingly the use of such devices as a proximity switch, ogive crush switch, or extensible probe, while functioning satisfactorily on contact with a target are not reliable for operation at distances beyond one or two feet and can have an adverse aerodynamic influence during projectile or vehicle flight. Accordingly, longer standoff distances may often be desirable.

Rangefinders are well established for detecting long range distances between objects. A coventional RF or optical rangefinder consists of a transmitter, target and receiver. The receiver measures the round trip transit time of the transmitted electromagnetic energy reflected back from the target. This provides an accurate, automatic long range rangefinder. However, at distances of less than approximately ten feet, such rangefinders become quite difficult to implement. At these very short ranges, a pulse transmitter must be limited to a nanosecond or less output, and the receiver (co-located with the transmitter) must recover from undesired reflected signal overload, electromagnetic interference and other transients within a similar time.

Another method consists of two optical systems, not coaxial, which produce a single blurred image of a target in which the blurring is caused by parallax. Changing the angle between the two optical systems causes the parallax to disappear for one range, providing a sharp image of a target at that one range. Measuring the new angle provides an indication of range for very short to moderate range targets. This method is most useful for ranges from 10 to 1,000 times the separation between the optical axes. It is, however, a complex task to automatically perform ranging in this method, due to the complex judgments involved in "best focus" of a target image.

SUMMARY OF THE INVENTION

The short range optical rangefinder provides the capability for rapid, automatic and accurate range determination for ranges of one to ten feet. In this short range optical rangefinder the presence of a solid object within the field-of-view of an optical receiver, and also within the illumination beam of an optical source, produces detectable scattered radiation. Differentiation of the signal amplitude provides a very repeatable peak in signal return (as a function of range), which peak is determined by a preselected desired range of maximum overlap of the two fields of view.

Relative motion between a sensor and a target to be ranged upon is required for temporal differentiation of the signal to provide the desired response. As target closure occurs, a maximum signal amplitude occurs, determined mostly by sensor and illuminator relative geometry, and very little by range squared. Differentiation of this signal provides a zero crossing voltage at the time of maximum signal return, and is indicative of the desired, preselected, range. Noise rejection is provided by a squelch type enable circuit, and false signals are heavily descriminated against by synchronous detection in the receiver circuits. A very accurate, very discriminating, and simple rangefinder results for short ranges of less than 10 feet, on moving targets.

DESCRIPTION OF THE PREFERRED EMBODIMENT

Figure 1:
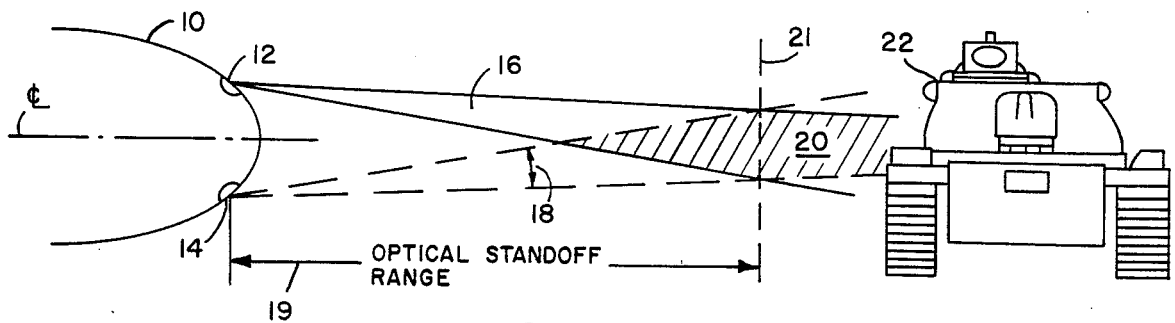
FIG. 1 is a diagram of a preferred embodiment disclosing optical standoff sensing of a target.

Referring now to the drawings wherein like numbers represent like parts, FIG. 1 is a drawing of the nose section of a projectile or missile 10 approaching a target 22 and having a transmitter 12 displaced to one side of the longitudial axis or center line of the missile and a receiver 14 displaced to the other side for adjustably looking ahead of the missile. The transmitter 12 is positioned for directing a beam of optical energy 16 at an adjustable and preselected look angle across the line of flight of the missile, which need not be the exact centerline of the missile. The receiver 14 is positioned at an adjustable look angle 18 that intersects the transmitted beam 16 ahead of the missile.

The volume of space where beam 16 is coincident with the field of view 18 creates a "window" 20 at a selectable location typically less than 10 feet ahead of the missile. The beam axis for beam 16 and the look axis for FOV 18 intersect in front of the missile and may pass through the missile longitudinal axis, with the transmitter and receiver adapted for pivotal or rotational movement to position the intersection point of the beam axis and the look axis at the desired distance in front of the missile. For ideal beam reflection from a flat mirror or polished target surface the angle of incidence of a beam of light on a target will equal the angle of reflection of the beam. However, for most real target surfaces such as military vehicles or weapon emplacements, the target surface is relatively rough or nonplanar and the transmitted beam reflected from such targets is dispersed over a larger angle allowing a greater region for positioning of window 20, the relationship between the angle of incidence and angle of reflection being insignificant.

In operation, the missile is launched or guided toward a target. Before reaching target 22, missile window 20 is not intercepting a target therefore no return signal goes to the receiver. While transmitted beam 16 may be reflected from numerous objects, no reflection is received by receiver 14 since this is outside established window 20. As the missile approaches target 22, the uneven surface of the target comes into the window 20.

The transmitted optical energy 16 is reflected from the tank within the field of view 18 of receiver 14 and is sensed by the receiver. A trigger signal may then be initiated, as for example, to begin a terminal mode of operation.

Figure 2:
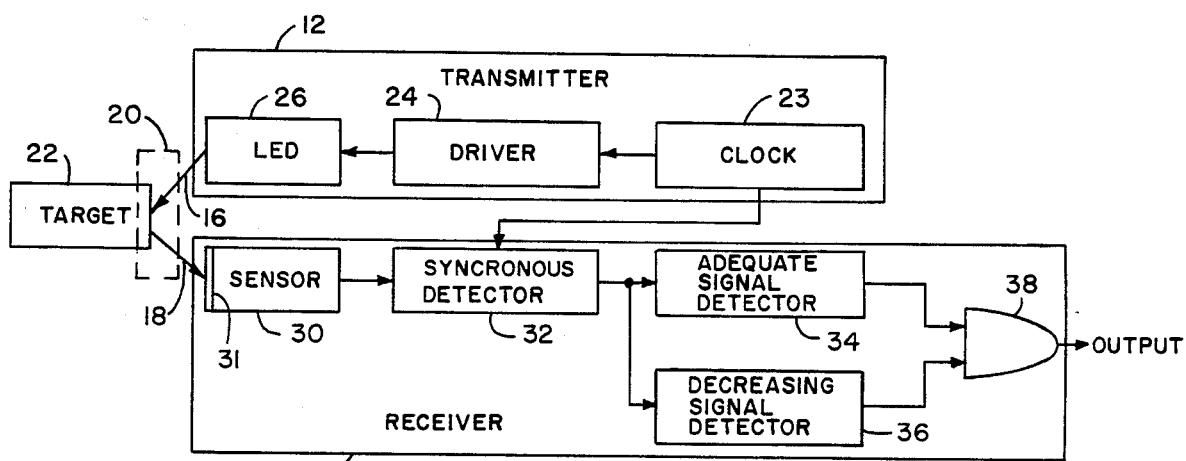
FIG. 2 is a block diagram of a preferred standoff sensor for use in the embodiment of FIG. 1.

FIG. 2 is a block diagram of a preferred standoff sensor for establishing the sensitive window 20, and more importantly, the precise standoff range 19 of FIG. 1. Transmitter 12 is comprised of three major parts; a clock 23, a driver circuit 24 and an optical source 26 with appropriate optics for providing an output beam. Receiver 14 comprises optics and optical sensor 30, sychronous detector 32, an adequate signal level circuit 34, a decreasing signal level circuit 36 for receiving and processing reflected energy and an AND gate 38. The two outputs from circuits 34 and 36 activate AND gate 38 which provides a trigger pulse output when target 22 and plane 21 reach coincidence. Clock 23 has outputs coupled to driver 24 and to detector 32, synchronizing the two circuits.

In operation, the window may be established immediately after launch but may be delayed since it is only necessary that the window be established prior to arriving a short distance from the target. Typically, missile 10 is launched from a ground or vehicle mounted launcher and flies an elevated flight path toward the target. The triggering window is above ground during flight and may be operating or inhibited. When the missile flies into close proximity of the target, the target enters the operating window and a reflected return of the transmitter energy is sensed by the receiver, detected by the receiver electronics, and a trigger pulse is initiated for missile reaction. The receiver is optically filtered and electronically tuned to detect reflected transmitter energy from any object that might enter the sensitive window. For objects outside the window no return energy would be sensed. The desired range is indicated by the processing circuitry when the target-missile distance coincides with the optical standoff range of FIG. 1, i.e. the distance between the nose of missile 10 and the point of maximum overlap in region 20 as indicated by plane 21.

Figure 3:
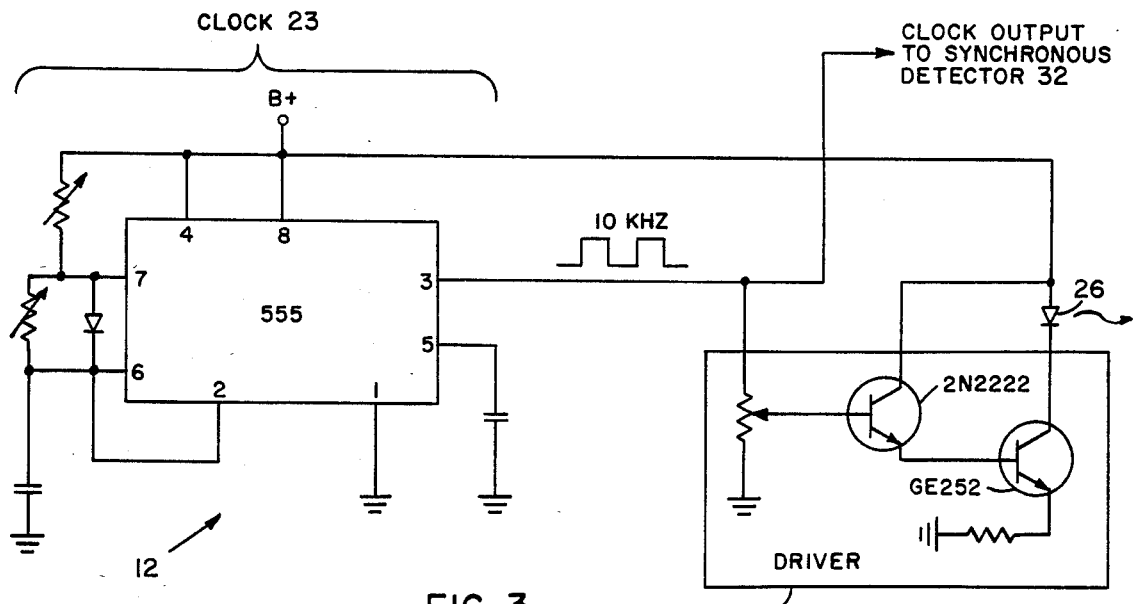
FIG. 3 is an optical transmitter schematic for use in the standoff sensor.

Optical transmitter 12 is shown in FIG. 3. The clock 23 electronics include a 555 timer wired in a standard astable configuration. The frequency of oscillation is arbitrarily set at 10 KHz. In driver 24 a 2N2222 and a GE 252 transistor are wired in a Darlington configuration to drive light source 26, typically a General Electric LED 55 gallium arsenide infrared diode. The diode emits non-coherent infrared energy with a peak wavelength of 940 nanometers and a typical output power of 3.5 milliwatts. A typical lens system on the diode unit gives the transmitter a beam width of approximately 13 degrees. A smaller beamwidth can be used to improve accuracy for longer ranges by changing the lens system.

Figure 4:
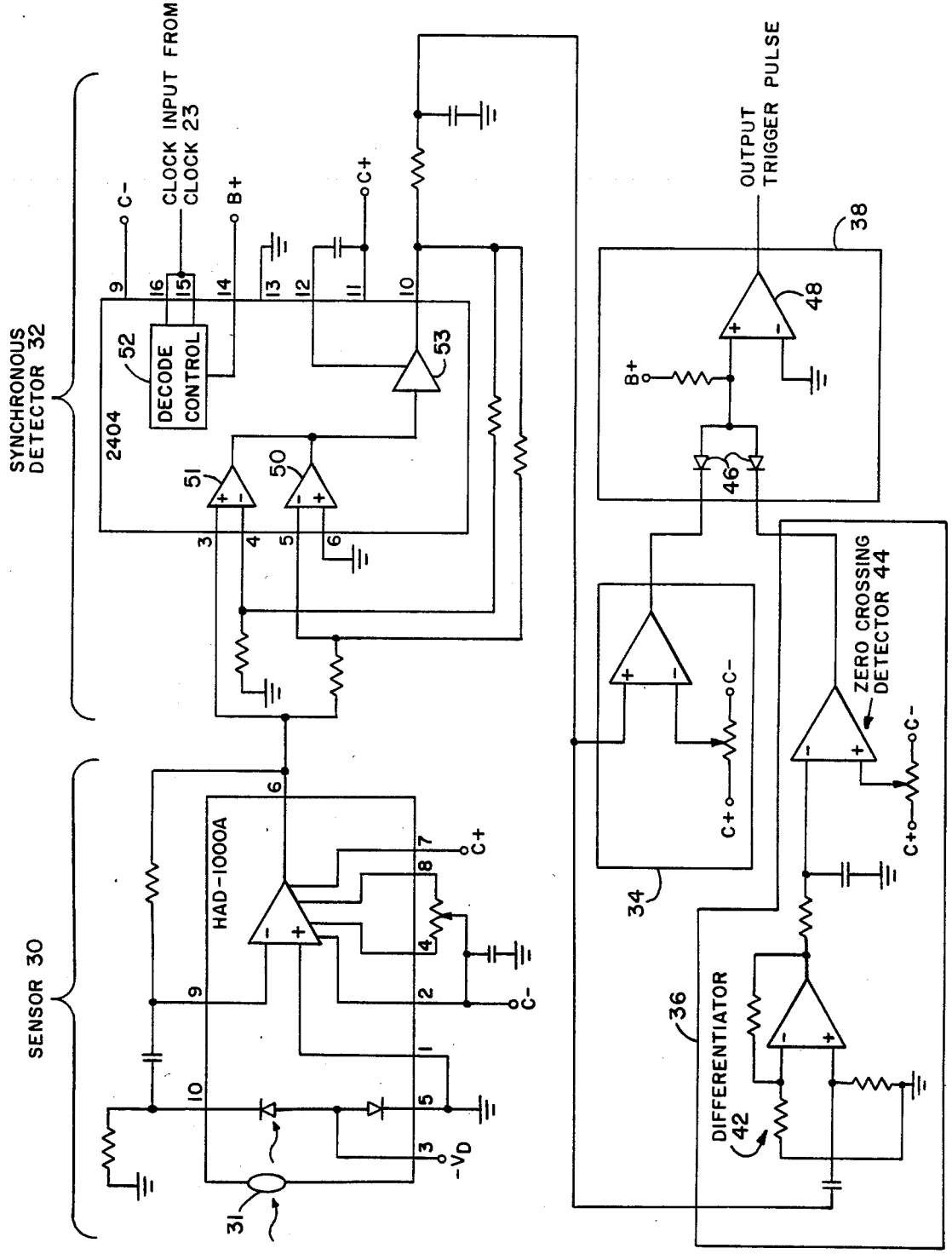
FIG. 4 is a receiver schematic for use in the standoff sensor.

The optical receiver is shown in FIG. 4. Sensor 30 is a detector and preamplifier in a single package, such as the EG and G mode HAD-1000A, wherein a photodiode circuit responds to impinging optical energy and converts the energy to a representative electrical signal. The electrical signal is then coupled to an operational amplifier which provides an electrical signal output to synchronous detector 32. A lens system 31 added to sensor 30 reduces the normal 80 degrees FOV of the sensor to a very narrow value. For example a 9mm diameter f1.5 lens reduces the FOV to approximately 6 degrees.

The synchronous detector 32 is an operational amplifier (op amp) circuit such as a Harris 2404 Programmable OP AMP (PRAM). The output of sensor 30 is connected to two amplifiers in detector 32. One amplifier 50 is wired in an inverting mode and the other amplifier 51 is connected in a non-inverting mode. The 10 KHz signal from clock circuit 23 is used to cause switch 52 to switch between the two amplifiers, thus making the output of summing operational amplifier 53 a DC level that indicates the amplitude of the received 10 KHz square wave at sensor 30. This synchronous processing is possible because of the transmitter square wave availability for this receiver switching function. The output of detector 32 is connected to two parallel circuits, the adequate signal detected 34 and decreasing signal detector 36. The decreasing signal detector has two series circuits. A differentiator 42 receives the input signal and couples an output to zero crossing detector 44.

The adequate signal detector 34 is an op amp wired in a comparator configuration. The level is set so the comparator trips when an appropriate level is received, but has a low false alarm probability from noise. The zero crossing detector 44 is also a comparator, and is set to trip whenever the output of the differentiator 42 crosses zero. Therefore, the output occurs at a maximum or peak signal into the zero crossing circuit. The output of adequate signal detector 34 and zero crossing detector 44 are AND'd together in gate 38 to form a fire pulse which occurs when the target is in range. The diode AND circuit 46 with operational amplifier 48 provides this output fire signal.

Figure 5:
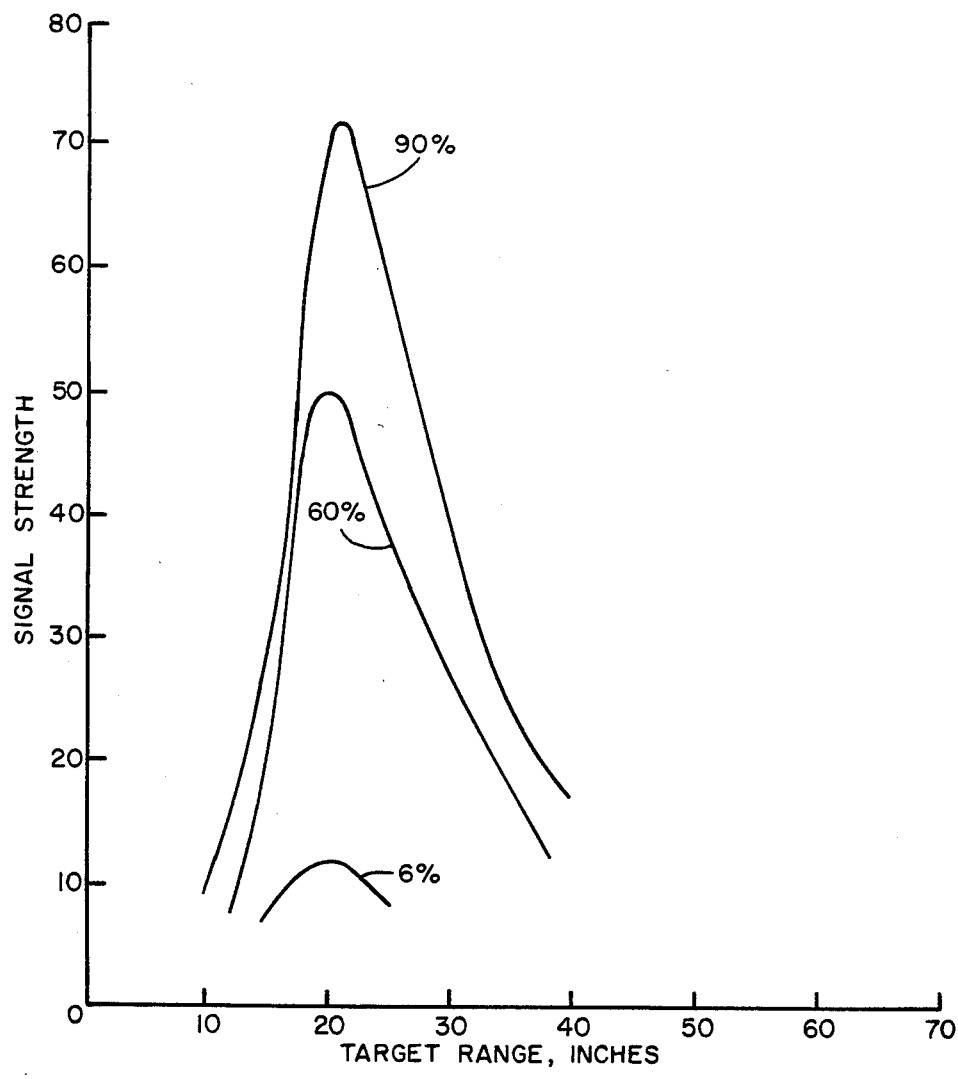
FIG. 5 is a typical response at the input of detectors 34 and 36 of the sensor system at a preselected short range for targets of differing reflectivity.

Static tests and dynamic tests have been performed using targets of different reflectivity and various ranges and the processed signal amplitudes therefrom have been measured. FIG. 5 shows typical results for the sensor when set for a 20 inch range. The peak signal strength (measured at the inputs to detectors 34 or 36) consistently occurs at the same range which coincide with the plane 21 of maximum window area (FIG. 1). Three degrees of reflectivity shown are 90% target reflectivity, 60% target reflectivity, and 6% target reflectivity. The target fire pulse from circuit 38 occurs at the peak of reflectivity in all cases due to the coincidence of outputs from detectors 34 and 36.

Thus, during operation, when a target enters the window 20, optical energy is reflected into lens 31 and coupled through the system to initiate a fire signal output. In accomplishing this, a signal threshold level is used to indicate the presence of a real target within the beam, and the return signal amplitude is also differentiated to provide a zero crossing when the maximum signal occurs. These two processed signals are AND'd to indicate that a real target is within the beam and is at the desired range. The sensor is independent of variations in target reflectivity. The absence of high frequency circuits of conventional rangefinders is a significant factor in achieving simplicity. In fact a GaAs LED, not a laser, will provide a satisfactory transmitter beam source.

In sensor 30, the particular HAD-1000A circuitry used, comprises a SGC-100A silicon photodiode and a field effect transistor operational amplifier. The photodiode has a spectral response from 350 to 1150 nanometers, with a noise equivalent power at 940 nanometers of $1.66 \times 10^{-13}$ w/$\sqrt{Hz}$ rms. Obviously other sensors and variations of the response ranges fall within the spirit and scope of the foregoing disclosure.

The sensor will activate or provide an outpout pulse in response to all material objects that fall within the correct range, including leaves and branches. Thus, where it is desired to restrict the types of targets responded to, various circuits may be used to provide additional gating restrictions. For example, if it is desired to respond to only larger ferrous targets, a magnetic field distortion sensor similar to that used to remotely locate submarines, or a capacitance variation sensor similar to those used to sense intruders approaching a conductive fence, could be added to the missile sensor to discriminate against these other targets in window 20. The optical fire signal would only be enabled if the magnetic field or capacitance sensor was rapidly changing, which would be the case for a missile approaching a larger ferro-magnetic object. An additional diode gate for AND circuit 46 responsive to such additional sensor output can provide such a control to the amplifier 48 output.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A short range optical rangefinder comprising: transmitting means for transmitting directional optical energy; receiving means closely adjacent to said transmitting means and disposed to provide a directional field of view for receiving directional reflected radiation of said optical energy and for providing an output signal in response thereto; said transmitting means being disposed for directing said radiation into the field of view of said receiving means for establishing a signal window region in close proximity to said transmitting and receiving means where the field of view and the transmitted radiation are coincident, said window having a plane therethrough at a predetermined spatial distance from said transmitting means and said receiving means for establishing a desired standoff distance from said transmitting means and said receiving means, said output signal being an output pulse indicative of passage of an object into said window and through said plane; and wherein said receiving means comprises a sensor for receiving optical energy and providing a variable electrical signal output responsive to variations in optical signal amplitude, a synchronous detector responsive to said variable electrical signal output for providing a direct current level output indicative of said variations in signal amplitude of said detected optical energy, and first and second signal detection circuits having inputs coupled in parallel to the output of said synchronous detector; said first signal detection circuit being a comparator for providing an output signal after a predetermined input signal level is received, and said second signal detection circuit providing an output signal when a peak in input signal level occurs; and wherein said transmitting means comprises a clock for providing a high frequency square wave output, light emitting means, and a driving means responsive to the output of said clock for stimulating said light emitting means to emission, said square wave output from said clock being further coupled to said receiving means synchronous detector for generating said detector's direct current output level which follows the amplitude of said reflected radiation.

2. A short range optical rangefinder as set forth in claim 1 and further comprising gating means having respective first and second inputs coupled to respective first and second signal detection circuit outputs for providing an output pulse when coincidence occurs between input pulses.

* * * * *